April 5, 1966 R. E. DESCHNER 3,244,013
DIAPHRAGM RETAINING STRUCTURE FOR HYDRAULIC CONTROL DEVICES
Filed Aug. 13, 1964

INVENTOR.
Richard E. Deschner

United States Patent Office 3,244,013
Patented Apr. 5, 1966

3,244,013
DIAPHRAGM RETAINING STRUCTURE FOR HYDRAULIC CONTROL DEVICES
Richard E. Deschner, 5550 Harcross Drive, Los Angeles, Calif.
Filed Aug. 13, 1964, Ser. No. 389,288
5 Claims. (Cl. 74—18.2)

This invention relates to improvements in diaphragm supporting and anchoring structures which are particularly adapted for use in hydraulic control devices.

In the construction of hydraulic units having thin walled diaphragms to retain the fluid, such as are described in Patent 3,027,152, a tapered retainer member and a tapered wall surface within the metal housing of the unit are used to anchor the outer tubular portion of the diaphragm to the housing. The cylindrical housing bore adjacent the tapered wall surface is used to support the said outer tubular portion of the diaphragm as it invaginates or stretches during movement of the plunger. This structure has proven to be reliable, but it is costly to manufacture metal housings containing accurate tapers with adjoining smooth bores. It is a main object of the present invention to lower the manufacturing cost of hydraulic units by providing means whereby a thin wall diaphragm may be supported and anchored within a housing having a straight-through untapered bore. Such housings may be manufactured inexpensively from ordinary steel tubing which has been honed smooth inside.

It is a second important object to facilitate manufacture and further lower the cost by eliminating the necessity for close axial tolerances on components assembled within the housings of hydraulic units.

Other objects and advantages will be apparent from the following detailed description of preferred embodiments of the invention.

Figure 1:
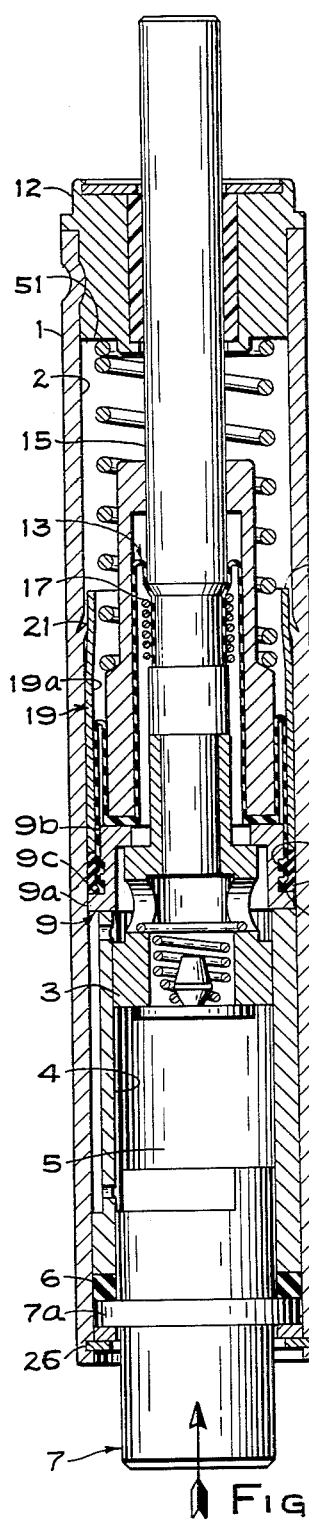
Figure 2:
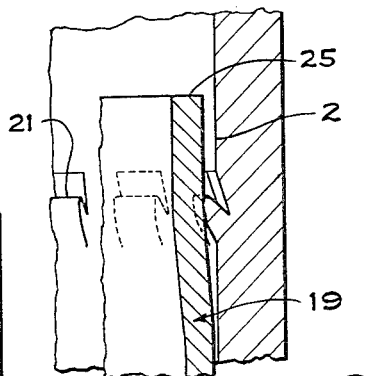
Figure 3:
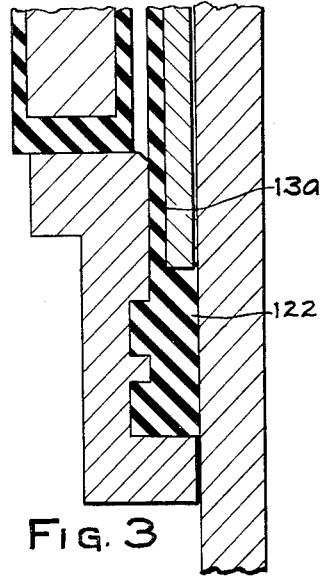
Figure 4:
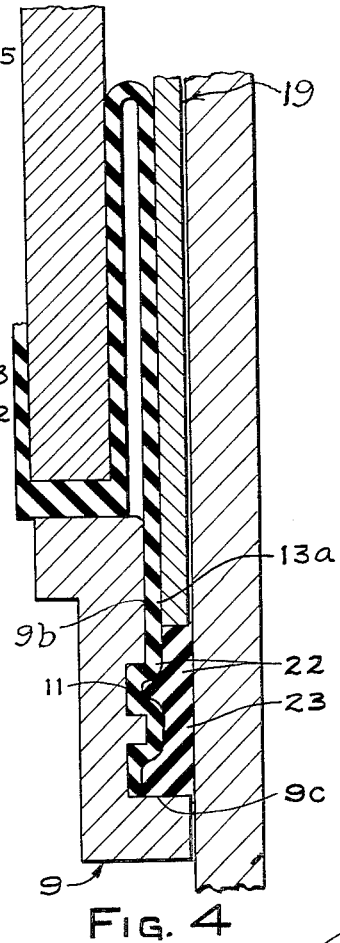
Figure 5:
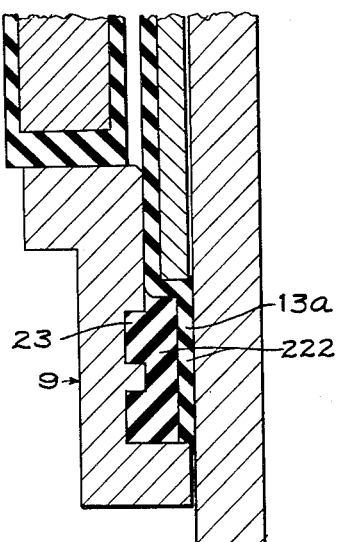

FIG. 1 is a substantially mid-sectional view of a typical hydraulic control device containing a preferred embodiment of this invention, FIG. 2 is a fragmentary view similar to FIG. 1, parts of the device being shown enlarged for clarity, FIG. 3 is an enlarged fragmentary view similar to FIG. 1 showing an alternate configuration for the resilient annulus, FIG. 4 is an enlarged fragmentary view of the diaphragm portion of FIG. 1, FIG. 5 is an enlarged fragmentary view showing another alternate configuration for the resilient annulus.

Description

In the drawings, FIG. 1 shows a typical hydraulic control device which comprises a housing 1 provided with a smooth untapered bore having a wall 2 and containing a piston 3 slidable within a cylinder 4 which holds fluid 5.

Cylinder 4 and a resilient fluid seal 6 are held in position between the flange 7a of plug member 7 and a retainer 9 which has a large diameter portion 9a and a small diameter portion 9b with a circumferential lateral shoulder 9c therebetween. Circumferential grooves 11 are provided in portion 9b. A cap 12 is provided to close the end of the housing.

The diaphragm 13 is anchored to piston rod 15 by use of elastic clamp means 17 as described in Patent 3,027,152, and is anchored to the housing by the improved diaphragm retaining structure of the present invention. The operation of assembling clamp means 17 on the piston rod takes place before the piston rod is installed in the housing and is not difficult, but installation of any structure which anchors the diaphragm to the housing is a quite different procedure because this installation must be made deep inside the relatively narrow bore of the housing. Notwithstanding this complexity, the improved diaphragm retaining structure of the present invention provides an efficient and inexpensive means for anchoring the diaphragm within a housing having a smooth untapered bore. It effects automatic compression of a portion of the diaphragm into a leakproof seal within the housing bore as the component parts of the hydraulic unit are assembled.

Shown in FIG. 1, the diaphragm retaining structure comprises the retainer 9, a dual purpose support and anchor tube 19, a constriction 21 within the housing bore wall 2, and a resilient annulus 22 attached to the diaphragm. The entire annulus may be molded integral with the diaphragm wall as indicated by numeral 122 in FIG. 3, or it may be made up of the diaphragm wall 13a with a separate resilient band 23 assembled thereto, as shown in FIG. 4 or FIG. 5.

The dual purpose support and anchor tube 19 of FIG. 1 supports the outer tubular portion of the diaphragm, and it also maintains moderate compression in the annulus 22 to anchor the diaphragm to the housing with a leakproof seal. The said tube 19 is preferably made of thin walled metal tubing which has an outer diameter of a size that will slide freely within the original bore wall 2 of the housing but not through the constriction 21. As will later be explained in more detail, the dual purpose tube is forced to enter the constriction during assembly, wherein it is held by a slidable clamping fit which permits but resists axial movement of said tube with a resistive force which is relatively constant at various positions of the said tube within the said constriction. If anchor tube 19 is made of soft metal, it may be deformed and reduced slightly in diameter as it enters constriction 21 as shown in FIGS. 1 and 2.

The constriction 21 may be formed by any means which reduces the cross sectional area of the bore slightly, but it is preferably formed by a chiseling tool which digs into the inner surface of the housing and forms individual protuberances spaced apart circumferentially around the housing bore as shown in FIG. 2. The individual protuberances form a discontinuous constriction which may be deformed somewhat by entry of the support and anchor tube. Deformability of the protuberances combined with some deformability of a soft anchor tube permits an unusually wide tolerance in the allowable diametrical interference fit between the tube and constriction without varying excessively the amount of the said resistive force.

Retainer 9 is preferably made of metal. Its large diameter portion 9a should have barely enough clearance inside the housing bore permit it to slide freely therein during assembly. After assembly, its small diameter portion 9b extends axially within the resilient annulus 22 and preferably some distance axially within the end of the said support and anchor tube.

Assembly of components

The components of the improved diaphragm retaining structure are assembled into the hydraulic unit by being pressed axially into the housing in the direction shown by the arrow in FIG. 1. At first, a very slight axial pressure is adequate because the parts slide in easily until the advancing end 25 of the support and anchor tube strikes constriction 21. At this point, more axial pressure must be applied in the direction of the arrow to keep retainer 9 moving, and as movement continues, the resilient annulus 22 is compressed, filling the entire space between the trailing end of the said tube and lateral shoulder 9c. Further movement forces tube 19 to enter and to be clamped by constriction 21 thereby providing the aforementioned slidable clamping fit between the constriction and the said tube. After the components have reached their assembled positions of FIG. 1, they are locked in place by snap ring 26. The anchor tube 19 is held in position supporting the outer tubular portion of the diaphragm and anchoring the resilient annulus firmly against the housing bore wall 2 with a leakproof fit. Anchor tube 19 must have sufficient frictional resistance within constriction 21 to maintain its assembled position permanently to insure permanently tight sealing of the diaphragm within the housing bore wall, yet it must move axially freely enough during assembly to safeguard the resilient annulus by preventing compression in the same from building up to a destructive amount which would extrude the annulus out of the cavity between the housing bore wall 2, retainer 9, and the end of anchor tube 19.

It will be seen that the final axial positions in which retainer 9 and tube 19 remain after assembly, may vary considerably without affecting the efficiency of this improved diaphragm retaining structure. Manufacturing tolerances may therefore be unusually liberal, permitting large variations in the lengths of components assembled within the hydraulic unit without affecting the ultimate performance. This is an important cost reducing manufacturing advantage.

It should be understood that the present disclosure is for the purpose of illustration only, and that this invention includes all modifications and equivalents which come within the scope of the subject matter claimed.

What is claimed is:

1. In a device having a reciprocative plunger and a housing with a bore enclosing a flexible diaphragm for containing fluid, said bore having a wall, said diaphragm having a tubular portion terminating in a resilient annulus, diaphragm supporting and anchoring structure comprising: a dual purpose support and anchor tube held within said housing bore surrounding and supporting said tubular portion of the diaphragm, said anchor tube having an end bearing against said resilient annulus, retainer means held within the housing bore having a small diameter portion and a large diameter portion with a circumferential lateral shoulder therebetween, said small diameter portion extending axially within the resilient annulus, said large diameter portion having a conforming fit within the housing bore wall, at least a portion of the resilient annulus being enclosed and compressed between said housing bore wall, said end of the anchor tube, and said retainer means, portions of the housing bore wall and portions of the anchor tube being shaped to maintain therebetween a slidable clamping fit which permits but resists axial movement of said anchor tube to limit compression in the resilient annulus, while maintaining sufficient compression therein to provide a leakproof seal for the diaphragm, the shape of said anchor tube being radially deformable from its shape in free position, the major portion of said housing bore wall being substantially cylindrical, and constrictive means extending radially inwardly from said housing bore wall contacting and holding deformed a portion of said anchor tube to provide said slidable clamping fit.

2. The subject matter of claim 1, said constrictive means comprising a plurality of individual protuberances projecting inwardly from said housing bore wall, said protuberances being spaced apart circumferentially and being formed from said housing and integral with the same.

3. In a device having a housing with a bore enclosing an assemblage of components including a flexible diaphragm for containing fluid, said bore having a wall, said diaphragm having a tubular portion, said tubular portion having a resilient annulus adjacent one end thereof, said resilient annulus having an outer diameter larger than that of said tubular portion; diaphragm supporting and anchoring structure comprising: a dual purpose support and anchor tube within said housing bore surrounding and supporting said tubular portion of the diaphragm, said anchor tube having an end bearing against the resilient annulus, and retaining means held within the housing bore, said retaining means having a large diameter portion, a small diameter portion, and a circumferential lateral shoulder therebetween, said large diameter portion having a conforming fit within said housing bore wall, said small diameter portion extending within the resilient annulus, said lateral shoulder and said end of the anchor tube being spaced apart axially to accommodate therebetween at least a portion of said resilient annulus while maintaining compression in the same, thereby forming a leakproof seal for the diaphragm between the housing bore wall and the small diameter portion of said retaining means, the shape of said anchor tube being substantially cylindrical, said housing bore wall being for the main part cylindrical but having inside a constriction at least partially surrounding and holding said anchor tube with a slidable clamping fit which resists movement of said anchor tube, but permits movement of said anchor tube to that axial position which accommodates the particular assemblage of components installed.

4. In a device having a housing with a bore enclosing an assemblage of components including a flexible diaphragm for containing fluid, said bore having a wall, said diaphragm having a tubular portion, said tubular portion having a resilient annulus adjacent one end thereof; diaphragm supporting and anchoring structure comprising: a dual purpose support and anchor tube within said housing bore surrounding and supporting said tubular portion of the diaphragm, said anchor tube having an end bearing against said resilient annulus, retaining means held within the housing bore, said retaining means having a substantially conforming fit within said housing bore wall, said retaining means and said end of the anchor tube being spaced apart axially to accommodate therebetween at least a portion of said resilient annulus while maintaining compression in the same and forming a leakproof seal for the diaphragm against said housing bore wall, the housing bore wall having a constriction contacting said anchor tube with a slidable clamping fit which resists but permits axial movement of said anchor tube, thereby maintaining compression in the resilient annulus while holding the anchor tube in such axial position as accommodates said assemblage of components.

5. In a device having a housing with a bore enclosing an assemblage of components including a flexible diaphragm for containing fluid, said bore having a wall, said diaphragm having a tubular portion terminating in a resilient annulus, means operable during assembly of the device for creating and maintaining compression in at least a portion of said resilient annulus, said means comprising: a dual purpose support and anchor tube within the housing bore surrounding and supporting said tubular portion of the diaphragm, said anchor tube having an end bearing against said resilient annulus, retainer means within said housing bore having a substantially conforming fit with the housing bore wall, said resilient annulus being enclosed and compressed during assembly between said housing bore wall, said end of the anchor tube, and said retainer means, thereby forming a leakproof seal for the diaphragm against the housing bore wall, portions of said housing and said anchor tube being shaped to provide therebetween a slidable clamping fit which resists but permits axial movement of said anchor tube to whatever axial position is required to accommodate the cumulative length of said assemblage of components, the shape of said anchor tube being radially deformable from its shape in free position, the major portion of said housing bore wall being substantially cylindrical, and constrictive means extending radially inwardly from said housing bore wall contacting and holding deformed a portion of said anchor tube to provide said slidable clamping fit.

(References on following page)

References Cited by the Examiner

UNITED STATES PATENTS 2,688,150  9/1954  Roussel _____ 267—64 X
3,027,152  3/1962  Deshner _____ 267—64 X
3,060,754  10/1962 Klinger _____ 188—100

FOREIGN PATENTS 953,409  12/1949  France.
943,568  5/1956   Germany.

MILTON KAUFMAN, *Primary Examiner.*

ARTHUR L. LA POINT, H, R. FIELD, *Examiners.*